United States Patent [19]

Hahn

[11] Patent Number: 4,482,306

[45] Date of Patent: Nov. 13, 1984

[54] PROCESS AND DEVICE FOR THE PRODUCTION OF ESSENTIALLY DRY MOLDINGS MADE FROM FOAMED THERMOPLASTIC, E.G. POLYSTYROL

[75] Inventor: Ortwin Hahn, Paderborn, Fed. Rep. of Germany

[73] Assignee: FLEWU AG, St. Gallen, Switzerland

[21] Appl. No.: 446,526

[22] Filed: Dec. 3, 1982

[30] Foreign Application Priority Data

Dec. 29, 1981 [DE] Fed. Rep. of Germany ....... 3151775
Oct. 7, 1982 [DE] Fed. Rep. of Germany ....... 3237175

[51] Int. Cl.³ ............................................. B29D 27/00
[52] U.S. Cl. ................................... 425/4 R; 264/40.4;
264/40.5; 264/40.6; 264/51; 425/140; 425/143;
425/149
[58] Field of Search ................. 264/51, 53, 40.4, 40.5,
264/40.6; 425/4 R, 140, 143, 149

[56] References Cited

U.S. PATENT DOCUMENTS 4,327,045 4/1982 Nishikawa et al. .................... 264/51
4,333,897 6/1982 Hayashi et al. ................... 264/51 X

FOREIGN PATENT DOCUMENTS

2237397 2/1974 Fed. Rep. of Germany .
3020753 12/1981 Fed. Rep. of Germany .

Primary Examiner—Philip E. Anderson
Attorney, Agent, or Firm—William A. Drucker

[57] ABSTRACT

The disclosure relates to a process and device for the production of moldings from foamed thermoplastic plastic, e.g., polystyrol, in a mold, the mold wall enclosing a mold cavity, into which a filling injector discharges, and which is surrounded by an agent chamber and in which there runs an agent channel which is formed by drillings which are sealed at their ends against the outside and the agent chest by means of seals, and are connected to the mold cavity through nozzles. The drillings of the agent channel preferably run in ribs of the mold wall. The agent chest and the agent channel are connected through time-overlapping-controlled valves to an agent supply and removal system for the heating, cooling, inflation, curing, ejection of the mold walls and the molding respectively. A fast cycle sequence is achieved with a small consumption of energy and a high molding quality.

2 Claims, 7 Drawing Figures

Fig.5

PROCESS AND DEVICE FOR THE PRODUCTION OF ESSENTIALLY DRY MOLDINGS MADE FROM FOAMED THERMOPLASTIC, E.G. POLYSTYROL

BACKGROUND OF THE INVENTION

The invention relates to a device for the production of mouldings from foamed thermoplastic plastic, in particular polystyrol, in a mould, preferably made up of two mutually sealed off component moulding tools, which with its mould wall encloses a mould cavity into which at least one filling injector for supplying foam material discharges; and which is surrounded by two independent agent supply and/or removal arrangements, one of which is connected to the mould cavity through nozzles and the other of which possesses a good thermal connection to the mould cavity, the arrangements being attached to one and/or if necessary other component moulding tool.

PRIOR ART

A moulding device for the production of dry mouldings from expandable polystyrol (EPS) is known from German Patent Specification No. 22 37 397. A two-chamber system for two mould halves is known in which the mould wall in the region of the mould can be heated or cooled without the moulding material or the moulding coming into direct contact with the heating or the cooling agent, and in which steam can be supplied separately to the mould cavity, to foam the pre-expanded moulding material into its final configuration. This familiar two-chamber system provides for comparatively large chambers and different pipes for the individual connections for the supply of the agents for the heating, cooling and inflation. What is disadvantageous with this known device is the fact that no mouldings of a complicated geometrical configuration can be produced, because complicated tools cannot be produced in accordance with this method and cannot be provided with good durability and imperviousness.

In an old German patent application No. P 30 20 753.3, the device is proposed in which the supply system for steam located in the heating or cooling chamber is led through a pipe system separate from the mould wall. A disadvantage are the many connections of the pipe system to the mould wall required there, with the nozzles located therein, since as a result of temperature change stressing high stresses occur which can cause leaks and consequently require a very rugged, thick but correspondingly thermally sluggish mould wall. In addition the production and installation outlay for the pipe system is relatively great. Furthermore there is an undesirably close thermal coupling of the pipe system with the heating and cooling chamber, so that in carrying out the process there are dependencies which cause time losses.

OBJECT OF THE INVENTION

It is the object of the invention to provide a device of the type first referred to herein which is considerably simplified in its design and which is distinguished by considerably increased conductivity, by considerably quicker thermal response and greater independence and smaller volumes in the supplies, with considerably improved operating reliability.

SUMMARY OF THE INVENTION

This object is achieved according to the invention in that one of the arrangements occurs as an agent channel formed by drillings, in each case directly in the mould wall.

Depending on the structure of the moulding, the thermal supply of the mould can take place through the agent chest attached to the mould wall and the supply of the mould cavity with inflating agents, compressed air, vacuum, etc. through the agent channel in the mould wall, or vice versa. Also, for specific structures, the agent channel or the agent chest can be provided for one component moulding tool only.

As especially advantageous further development is the structuring of the mould wall with stiffening ribs and very thin connecting walls, the drillings of the agent channel running in a star or grid pattern, up to the critical moulding edges and points. The desired effects according to the terms of reference will thereby be achieved in a reinforced manner; the cycle times of the moulding processes can thus be further reduced, and the energy requirement is further reduced as a result of the smaller thermal capacity of the mould wall and the smaller theraml resistance.

An advantageous further development, in an independent inventive concept, is the shifting of the connections for supplying the agents to the agents channel into the sealing-off wall of the component moulding tools, which forms the external end of the agent chest. By this means a standard tool section with fixed agent connections is formed as a basis for a multiple tool, for which only the mould walls need to be exchanged in each case, which saves considerably in preparing times and costs.

A connection leading off the system can carry a distributor or valve block per mould section for the introduction of compressed air, vacuum, or steam, as well as heating or cooling agents into the system. The separated valves or isolating devices are to be opened and closed by choice and independently from one another, and permit the separate agent supply in an arbitrary sequence.

The independent agent supply in the channel is guaranteed for all mould sections and can be matched to the process execution in an arbitrary sequence.

The device according to the invention makes possible in particular the overlapping execution of the process, in which for instance the mould can be filled already in the preheated condition or also during heating, since no steam and no moisture penetrates into the mould cavity. It also permits the over-pressure present in the mould during the filling operation to be eliminated without the mould temperature being impaired thereby or the heating operation having to be interrupted.

The low thermal sluggishness or low heat capacity of the mould wall and its low thermal resistance, and in addition the very small volume of the agent channel and the low thermal coupling of the arrangements permit both a fast as well as a considerably more precise and simple process execution, since down times which have to be observed hardly occur.

In a novel, especially advantageous embodiment, e.g. for relatively large moulds, the supply connections are mounted on both sides of a component mould tool. By this means the agent can be supplied to the mould's cavity from either side as required, i.e. with little resistance to flow, or the complementary supply and evacuation of an agent, e.g. steam supply-condensate discharge, can be connected to the connections alternately. In specific cases the agent channel can also be led separately in two regions.

Further particular advantages of the invention are:

1. The option of supplying different agents to both mould sections mutually independently, both to the agent chests as well as into the agent channels, and 2. To steer the supply of an agent from a channel system into the mould cavity, with discharge from the mould cavity through the channel system of the other mould wall (agent through-flow).

3. The possibility, with only a slight conversion effort, of sealing off the agent channel of one or other of the mould sections or all mould sections against the mould cavity as required, and using it as a heat-exchanger system.

4. The possibility of controlling the individual agents separately regarding quantity and temperature, and thereby influencing the temperature of particularly critical mould points.

5. The possibility of evacuating the mould cavity through the agent channel of one or other or all of the mould sections or of evacuating or allowing to escape through the agent channel of one or other or all mould parts, as required, the over-pressure occurring during the filling of the mould cavity, in particular at critical points of the mould, and of achieving a controlled flow when filling the tool and consequently reliably shaping even complicated geometries in thin-walled mould sections.

6. The possibility of introducing compressed air through the agent channel of one or other or all of the mould sections into the mould cavity, specifically for supporting the ejection operation at critical points of the mould.

7. The possibility of controlling all control devices for the supply of agents mutually dependently or independently or in sequence, and 8. The possibility of providing common or separate supply systems for the supply of agents to the mould sections, as required.

Because the agents in the two arrangements can be fed largely independently, process engineering-wise, the device according to the invention is particularly suitable for a process pattern controlled by means of feed-back. The process execution described below is however also advantageous and inventive in itself.

For its execution, throttle valves and pressure detectors are fitted before the supply points of the agents, and temperature detectors at the outlets, the output signals of which serve to control the process.

The completion of the inflation process is controlled through the rise in pressure with reduced flow.

The ejection by means of compressed air is terminated by a drop in pressure.

The heating is terminated as a result of the temperature rise at the agent discharge.

The cooling is terminated as a result of the temperature drop at the agent discharge.

The supply of the moulding material and the opening and closing of the mould are also carried out at specific temperatures or pressures.

Breakdowns in the operation as a result of poor closing of the mould, wrong temperatures of the agents or unsuitable moulding material are automatically detected and signalled by means of a time monitoring of the process steps. By this means optimum process times are produced with increased reliability and uniformly optimum product properties.

A further advantageous development of the device and the process execution is that the component moulding tools are fitted with a distance detector, with the output signal of which the mould is so controlled that the mould cavity has an increased volume so long as the filling and inflating operation continues. Subseqent to this, as a result of further high heating and closing of the mould to the final volume of the mouldings, they will be greatly compressed, especially at their surface. This additional compressing process represents an independent invention. The device with separate arrangements for the carrying of agents, and especially with such of small thermal sluggishness, is therefore especially suitable since the surface of the mould wall can be heated up rapidly and selectively without the complete moulding being heated through, so that essentially the surface of the moulding, if necessary in specific regions, is concentrated. This results in new, advantageous, hitherto unobtainable properties of the moulding. Furthermore, the ribs in the mould wall are especially suitable for accommodating the high pressure.

An advantageous development of the agent channel is that the latter is not subsequently drilled into the casting of the mould wall, but is introduced into the casting mould for the production of the mould wall, at least partially in the form of pipes which preferably run spirally, in loops or meanderingly.

Since the pipe is made very thin-walled, the stress which occurs between the different materials when the casting cools is so slight that it can be accommodated by the casting without resulting in noticeable deformations of the mould wall. Shaping a rib over the pipe has proved particularly advantageous in this respect and for decreasing the thermal capacity of the mould wall.

In the case where the mould wall has a complicated contour, it is an advantageous development of the invention to make up the mould wall from a section carrying the contour and another section carrying the agent channel. With this structure, no stresses are transmitted to the inner mould wall. The agent channel arrangement can be manufactured independently and in some circumstances from standard parts.

BRIEF DESCRIPTION OF THE DRAWINGS

Some embodiments of the invention given by way of example are discussed in greater detail below, with reference to the drawings.

In the drawings:

FIG. 2b shows the agent channel in its shape before being cast in;

DESCRIPTION OF THE PREFERRED EMBODIMENT

Figure 1:
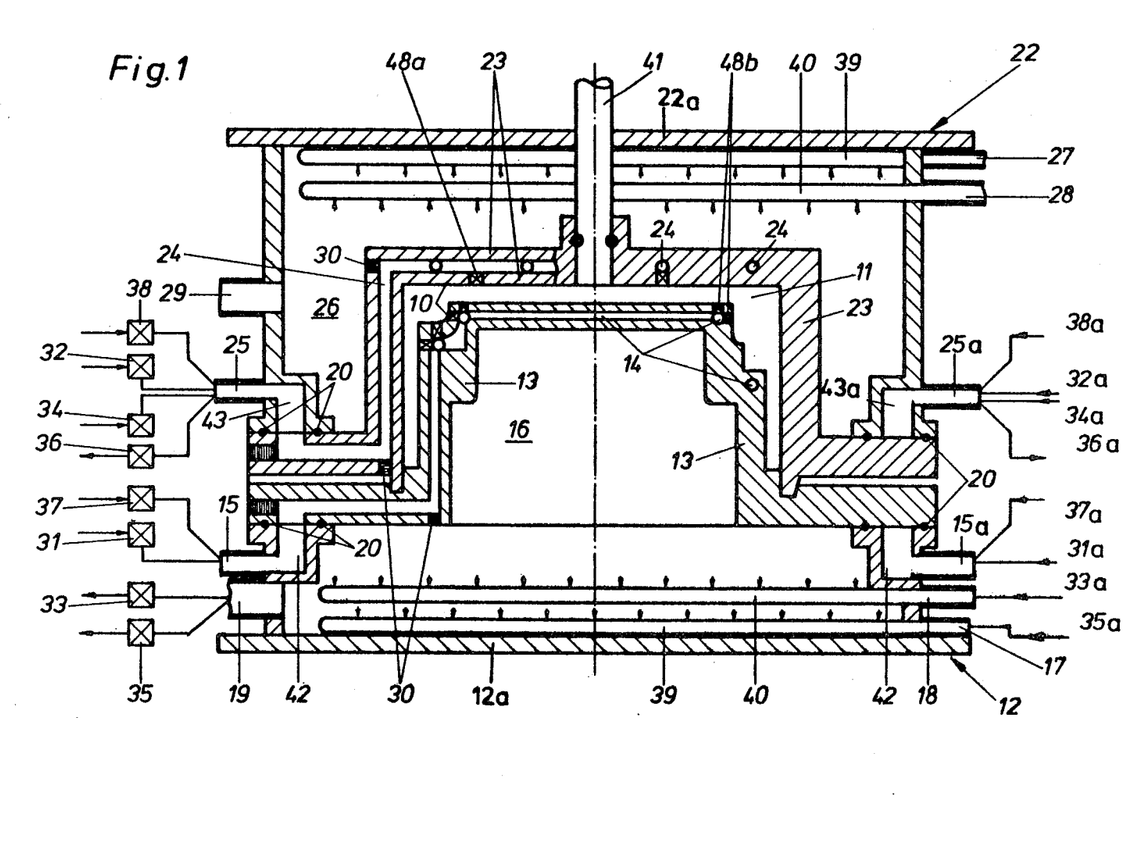
FIG. 1 shows a two-section mould.

In the example of FIG. 1 the device is in two sections, namely designed with a lower component moulding tool 12 and an upper component moulding tool 22. Both component moulding tools 12 and 22 form with their actual mould walls 12 and 23 respectively the mould nest 10, these mould walls 13 and 23 enclosing the mould cavity 11 tightly. The separation surfaces between the two mould walls 12 and 23 have in their peripheral direction a step and a groove respectively, so that both mould walls 13, 23 are mutually fixed in the axial and the radial directions.

The upper component moulding tool 22 forms an agent chest 26 between the end wall 22a and the mould wall 23. In the agent chest 26 (steam chamber), an opening 27 for the admission of a heating agent and an opening 28 for the admission of a cooling agent and a condensate discharge opening 29 are provided.

In the end wall 22a are located connections 25, 25a which are fluid-tightly connected through connecting channels 43, 43a to the agent channel 24 in the mould wall 23 via seals 20, for the supply of steam or other foaming agent through a valve 32, compressed air through a valve 34, vacuum through a valve 36 and solvent vapour through a valve 38.

The steam to be supplied in this manner serves mainly to foam and sinter the material content. The compressed air can be used for the direct cooling of the moulding and removal of the latter from the mould. The vacuum may be useful for the forced evacuation of the mould nest 10 during the filling operation. Further agents, e.g. $CO_2$, nitrogen or organic solvent vapours, can be used for direct cooling of the moulding, as well as for a specific influencing of the sintering process and for special surface curing of the partially or completely foamed moulding.

In an equivalent manner, in the lower component moulding tool 12 the mould wall 13 is attached to an agent chest 16, the heating and cooling inlets of which 17, 18 are arranged on one side, and the condensate or cooling agent outlet 19 is provided on the other side. Devices 39 and 40 for the energy-saving distribution of the heating and cooling agents are fitted in both agent chests 16, 26. The upper component moulding tool 22 also has, integrated into the agent chest 26, a filling injector 41 through which pre-expanded foam material can be supplied into the mould cavity 11. The filling injector 41 can at the same time also be designed as an ejector.

In the mould wall 23 of the upper component moulding tool 22 there is integrated a channel system 24 which is agent-tightly isolated against the heating and cooling agents which reach the chest 26 through the supplies 27 and 28 in the chest 26 and through the distributing devices 39 and 40. The agent channel 24 running in the mould wall 23 is connected to the connections 25, 25a through the separating surface between the mould wall 23 and the agent chest 25 through connecting channels 43, 43a.

The agent channel 24, integrated into the mould wall 23, is designed transversely in the form of drilling. The ends of these drillings are closed off by means of plug-like seals 30. Towards the mould cavity 11, the agent channel 24 is provided with nozzles 48a, through which the agent passes from the agent channel 24 into the mould cavity 11 for the purpose of heating, sintering, cooling, curing or removing from mould of the material content and the moulding respectively.

A comparable agent channel 14 including nozzles 48b is formed in the mould wall 13 in the lower component moulding tool 12.

In the case where only one component moulding tool needs to contain an agent channel, this will preferably be fitted in that component moulding tool in which the agent channel can more easily be integrated from the production technique aspect.

For special structures of the moulding it is expedient to design the agent channel 14 in the lower component moulding tool 12 differently from the agent channel 24 of the upper component moulding tool 21 and, in the one component moulding tool to connect the agent channel to the mould cavity 11 through the nozzle 48a, and in the other component moulding tool 12 not to insert any nozzles, but to form a closed agent channel by sealing the drillings at their ends.

Figure 2:
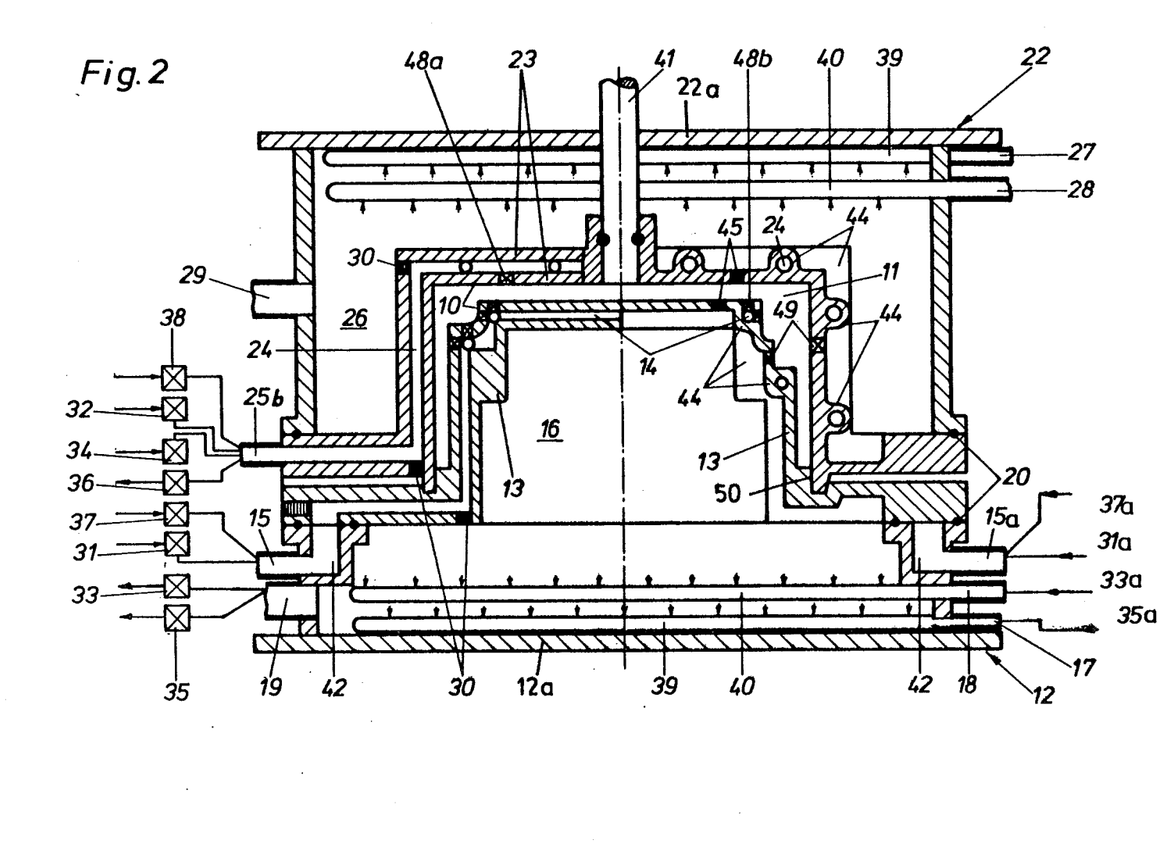
FIG. 2 shows a two-section mould with an agent channel running in ribs.

One can also specify that the mould wall 13 or 23 of the component moulding tool 12 or 22 is designed with nozzles 45 located between the agent channels 14 or 24 (FIG. 2).

In the example of FIG. 2 the device differs inter alia from that according to FIG. 1 in that the mould walls 13 and 23 are designed considerably thinner and are reinforced with rearward rib-shaped projections 44 in the region of the drillings forming the agent channel 14 and 24 respectively. The ribs are led transversely and vertically, specifically over the corner points of the mould. Especially there, the agent channels 14, 24 are fitted with nozzles 48a, b to facilitate filling and ejection. The ribs also act as favourable stiffening of the mould wall 13, 23 at the corner points or edges, despite a low use of material for the casting. As a result of the small wall thickness of the mould wall 13, 23, a more rapid temperature equalisation takes place, which reduces the occurrence of thermal stresses in the mould wall and prevents the occurrence of stress cracks, especially as a result of the continuous thermal stress reversal.

In FIG. 2 the connection 25b for the supply and removal of agents is led directly into the mould wall 23. By this means the need for an additional sealing towards the outside or towards the agent chest 26 disappears. Naturally a complementary connection leading directly into the mould wall 23 can also be fitted on the opposite side of the component moulding tool 22, should this be necessary.

Figure 2A:
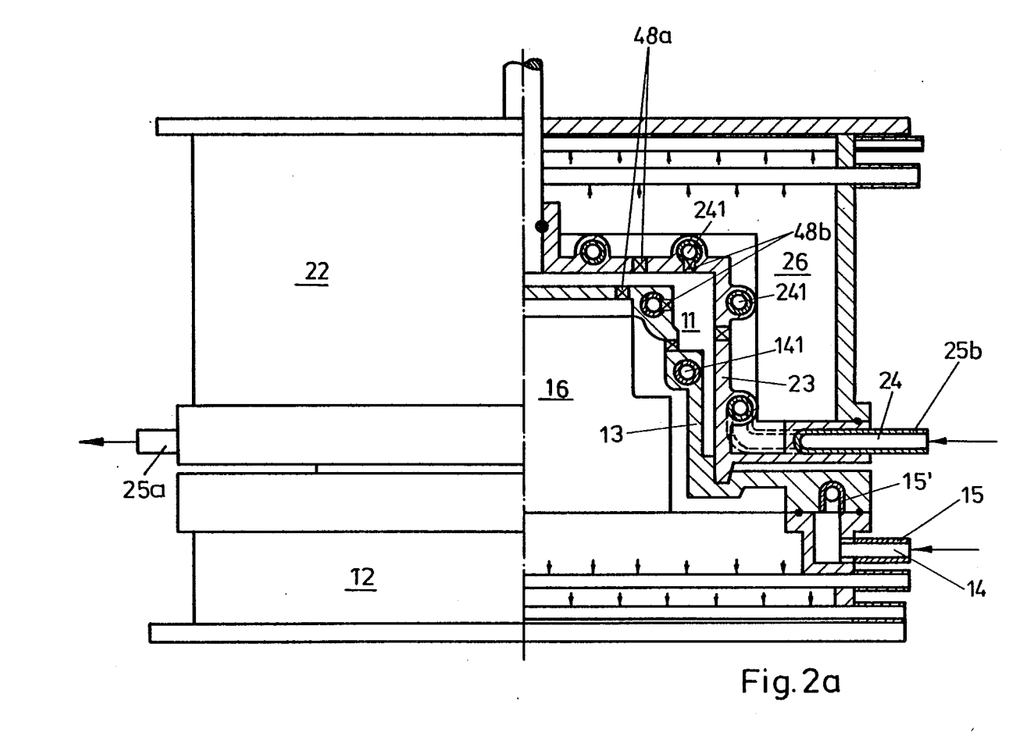
FIG. 2a shows a mould wall with cast in agent channel.

FIG. 2a shows a mould wall, 13, 23 with "drillings" cast in the form of pipes. To this end a thin brass or steel pipe 241, formed as a helix in the region of the cylindrical section of the mould wall and as a spiral in the front section of the mould wall, is embedded in the aluminium casting. This makes possible a considerable saving in time and cost when making the mould wall 13, 23. The nozzles 48b are inserted into a drilling which penetrates the casting as far as the pipe 241. The pipe is led out as connection 25b for further connection to the supply.

Figure 2B:
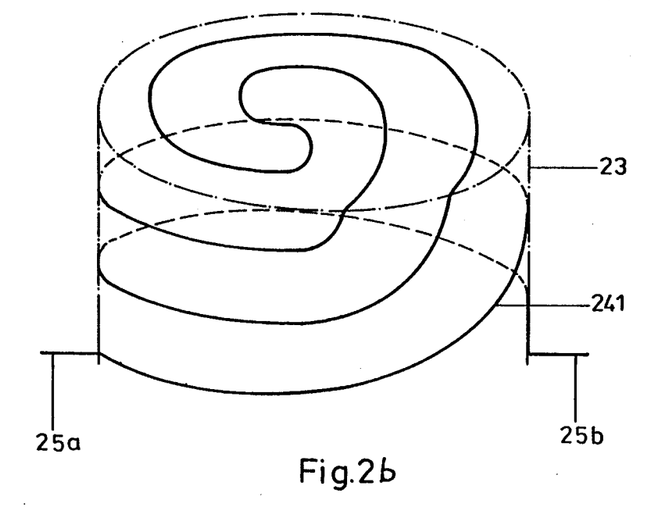

FIG. 2b shows the shaping of the pipe 241 of the mould wall 23 as a helix and a spiral respectively.

Instead of the direct leading out of the ends 25a, b of the pipe 241, a supply of the agents can also be provided for by means of sectional drillings 42 or an annular channel and a pipe nozzle 15, as shown for mould wall 13. It may likewise be expedient for moulds with a complicated structure to use pipes for long continuous agent channels and to execute short connecting regions as a drilling.

Over large surfaces it is expedient to lead the agent channel in a meandering shape and e.g. round a cylinder as a helix and at the end surface as a spiral.

An arrangement of the tube 241 for a cylindrical mould wall 23 is shown diagrammatically in FIG. 2b, a one-section design having been selected. By leading the pipe in ribs which surround the cylinder, such a uniform distribution of the stresses, which are caused by temperature change on account of the different coefficients of expansion of the casting and the pipe material, occurs that a serious deformation does not take place. Naturally several independent pipes can also be cast into a mould wall, one of which can for instance replace the associated agent chamber.

Figure 3:
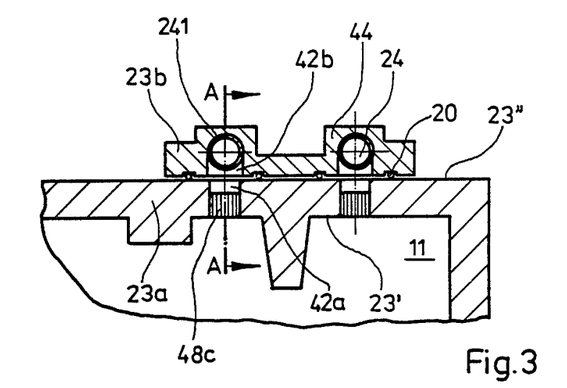
FIG. 3 shows an assembled mould wall, in section.
Figure 4:
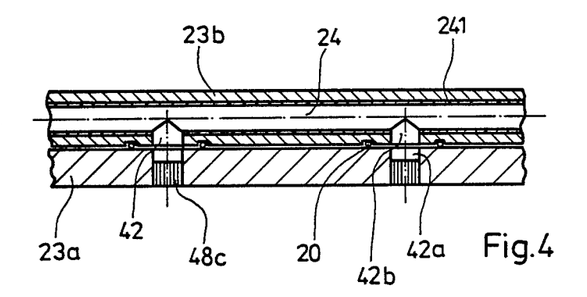
FIG. 4 shows the mould wall of FIG. 3, sectioned at right angles.

The embodiment according to FIGS. 3 and 4 is especially suitable for mould walls with complicated contours. Those figures show sections of a mould wall in different directions, the mould wall 23a carrying the contour face 23' of the moulding pointing in the direction of the mould cavity 11, and on the other side a smooth surface 23", on which a second section of the mould wall 23b is mounted which contains the agent channel 24. The agent channel 24 is led with pipe 241 in ribs 44. The agent channel 24 is connected to the mould cavity 11 through drillings 42a, b in the pertinent sections of the mould wall 24a, b. Round the drillings 42a, b, the gap between the sections of the mould wall 24a, b, is sealed with seals 20, which are inserted in each case in a groove. There is a nozzle fitted in each case in the drillings 42a, facing the mould cavity 11.

FIG. 4 shows a section along the line A—A in FIG. 3.

In section 23b the agent channel can be led in arbitrary form without the production of the mould wall 23a being complicated as a result. The manufacture of both sections is thereby considerably simplified, both from the casting as well as from the drillings and connections aspects. Depending on the shape of the mould wall, the fitting of sections carrying several agent channels, e.g. on different surfaces, can also be expediently provided for.

The agent channels can be cast into plates, extruded or pressed.

In the factory pre-expanded foam material, e.g. polystyrol in granulate form, is introduced through the filling injector 41 into the mould cavity 11 of the already pre-heated component moulding tools 12 and 22, the injector air being evacuated through the nozzles 48a, b, the agent channels 14 or 24 and the opened valve 36. During this phase of the operation the compressed air valve 34, the valve 32 for the foaming agent, as well as the valve 38 for a further process agent to be introduced into the mould cavity are closed. The equivalent applies to the lower component moulding tool 12 and, if necessary, the connections with the corresponding reference number with the index a.

On completion of the filling operation, the vacuum valve 36 is closed and the foaming agent valve 32 is opened. Preferably this can also take place as follows:

On completion of the filling operation the valve 31 for the supply of foaming agent is opened. The foaming agent flows through the agent channel 14 and the nozzles 48b into the mould cavity 11 filled with granulate and flows through the cavity on account of the pressure gradient between the agent channel 14 and the agent channel 24 which is still subjected to a vacuum. After a process-specific time, the through flow can be terminated by closing the vacuum valve 36, and the foaming agent valve 32 can also be opened.

In this way steam impregnation which is comparable to the steam shock technique is possible, but with the advantage that different agents can be used for the heating of the component moulding tools 12 and 22 and for the foaming or, when using the same agent, e.g. steam, it is possible to operate with different pressures and temperatures during the heating and the foaming.

In addition there is the fact that, as opposed to the steam shock method, the heating and cooling of the mould walls 13 and 23 takes place independently of the filling operation and the foaming and removal from the mould process.

The perfusion of the mould cavity 11 with an agent can also be provided for by the simultaneous supply of the agent from both sides and leaving a residual gap 50 free between the mould walls 13, 23, through which the escape of exhaust air or condensate takes place.

This flowing through to the residual gap 50 can also be achieved by alternate one-sided agent supply with a simultaneous closing of all other valves at the agent channel 14, 24, if this is desired with regard to the achievement of different surface welds. With the novel device, it is thus possible to achieve with the novel process execution not only savings in time and cost, but better novel product properties are also achieved.

During the filling of the mould cavity 11 with particulate filling material, it is possible for the injector air to escape through the residual gap 50 as a result of the appropriate shaping of the separation surfaces or as a result of the incomplete closing of the mould cavity 11 when the two component moulding tools 12 and 22 are engaged together during the filling. On completion of the foaming operation, the valves 31 and 32 for supplying the foaming agent are closed and, if surface curing is desired, the valves 37 and 38 are opened for the supply of suitable, e.g. readily dissolvable agents into the mould cavity 11. The cooling of the mould walls 13, 23 can, as a result of the termination of the supply of heating agent through connections 17 and 27, as well as the beginning of the supply of cooling agent through the connections 18 and 28, be started even before the completion of the actual foaming operation or of the surface curing, or also on completion of the same. The cooling of moulding, after completion of the foaming operation and of the surface curing and closing of the associated valves of the pertinent agent supplies, and by subsequent opening of the valve for the supply of a gaseous cooling agent directly to the surface of the moulding, namely through one or both agent channels 14, 24 and the nozzles 48a, b, can be assisted and accelerated.

As soon as the moulding has reached the removal from the mould temperature necessary for its shape stability, the cooling of the mould walls 13, 23 and any direct cooling of the moulding used is terminated by closing the valves of the cooling agent supply, and the removal from the mould of the moulding is carried out by opening up the component moulding tools 12 and 22. This can be assisted by means of compressed air supplied through one or both agent channels 14, 24, or by means of a mechanical ejector.

On completion of the cooling, as a result of terminating the supply of cooling agent, it is possible to begin again immediately with the heating of the mould walls 13, 23. This takes place already during the removal from the mould operation, so that the mould walls, after reclosing of the mould cavity 11 for the filling of the mould cavity 11, are already at foaming temperature and most important of all are free from moisture, as a result of which the filling operation is considerably facilitated and accelerated.

Especially in the production of thin-walled mouldings, it is possible to operate with different temperatures in the individual mould walls 13, 23, as a result of which it is possible to achieve still more savings in time, especially in relation to the cooling operation.

Figure 5:
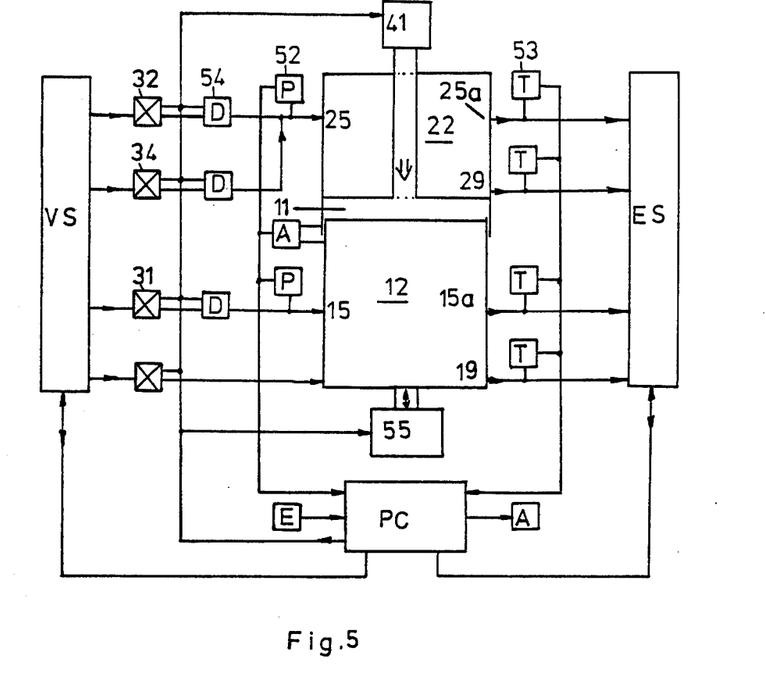
FIG. 5 shows the overall arrangement.

FIG. 5 shows an overall plan of a complete device for carrying out the process control in accordance with the process.

Component moulding tools 12, 22 are connected to the agent supply arrangement VS e.g. through the control valves 31, 32, 34 and the throttle valves 54, D connected in series with the latter, and the connections 15, 25. The connections 15a, 25a 19 and 29 are connected to the evacuation system ES. After the throttle valves pressure detectors 52, PM are connected which give a signal corresponding to the pressure level, or at a specified pressure level in each case, which signal is led to the process-control device PC. At the connections for the evacuation, temperature detectors 53, TM are connected which in each case give a signal corresponding to the temperature or if a specific temperature is exceeded or dropped below, which signal is also led to the process-control device PC.

The distance of the two component moulding tools is signalled by a distance detector AM to the process-control device PC. From an input E further signals are led to the process-control device PC as specifications for the process, e.g. pressure or temperature threshold values, distance value and maximum times for the process steps.

The process-control device PC has control outputs which e.g. switch on or off or control the control valves 31, 32, 34, if necessary the throttle valves 54, the injector 41 and the mould-closing motor 55.

In addition the supply and evacuation arrangements are connected to the process-control device PC for control and monitoring.

The degree of heating or cooling of the mould wall is determined from the agents discharged, and from this the further control of the process is governed. The degree of expansion of the moulded material is determined by means of the pressure detector at the agent supply, since the pressure drop in the mould increases in parallel with the pressure drop at the throttle valve. At a pressure specified in each case the next step in the process is introduced.

By means of the distance detector, which may be made up of e.g. limit switches, the mould can be pressed together with the closing motor 55 varyingly powerfully according to the detector's signal.

The duration of the individual process steps thus results from the actual time required to achieve the desired function, also when the agents introduced into the process and the moulded material are added with tolerances in the process-relevant data. A monitoring of specified limit values of the tolerances is carried out by means of limit time monitoring of the individual process steps. In the event of excesses, this will be signalled by an alarm device A of the process-control device. The control pattern is moreover largely independent of the mould walls used in each case, which determine the shape of the moulding. The conversion is consequently simplified.

It is furthermore advantageous, depending on the times of the individual process steps, to set the specifications for the control of the supply and or evacuation system(s), e.g. by raising or lowering the agent temperature. This results in a further shortening of the process time with a simultaneous attainment of optimum operating conditions for the improvement of quality.

The embodiment described is only by way of an example and can be altered within the scope of the invention as defined in the appended claims, e.g. by combining the control and closing valves, moving the valves and pressure detector to the outlet of the mould connections and appropriate adjustment to the use of further agents.

The types of process steps described in the description: the transverse perfusion of the mould cavity 11, the supply of curing agents, the reheating and repressurizing, the independent operation of the agent chamber and the agent channel and the control depending mainly on feed-back signals, as well as the retroaction of the control on the supply and evacuation arrangements, can in each case be used on their own as well as in an arbitrary combination with increased effect.

Practical trials have shown that mouldings which have been produced in a device according to the invention with a process according to the invention contain only 5 to 10 percent by weight of moisture compared to conventionally produced parts which normally contain 25 to 30% moisture. A drying process can consequently be waived, which results in a considerable saving in the cost of manufacture.

The filling injector 41 and correspondingly arranged ejector are surrounded by seals 60 which seal off the mould cavity 11 against the agent chest 26.

We claim:

1. In a mold, for the production of moldings from particulate foamable thermoplastic resin, having:
    (a) first and second mold components (12;22) each including a respective mold wall (13;23), said mold walls (13;23) together bounding a mold cavity (11), each said mold wall (13; 23) including respective passage means (14;24), for a fluid agent, communicating with said mold cavity (11), and each said mold component (12;22) including other wall means (12a; 22a) bounding, with said mold wall (13;23), a chamber (16;26) to receive a fluid agent,
    (b) an injector pipe (41), for inflow of particulate foamable material, opening into said mold cavity (11),
the improvement which comprises:
    (i) each of said passage means (14;24) communicating with with mold cavity (11) through nozzle means (48b;48a) disposed in the respective mold wall (13;23),
    (ii) each of said passage means (14;24) having a single flow connection (15; 25) for both supply and removal of fluid agent, and
    (iii) each of said chambers (16;26) being sealed with respect to said mold cavity (11), and having at least one inflow connection (17,18;27,28) for fluid and at least one outflow connection (19;29) for fluid.

2. A mold, as claimed in claim 1, wherein:
    (a) said second mold wall (23) comprises a first layer (23a) and a second layer (23b),
    (b) said first layer (23a) has one surface (23') bounding said mold cavity (11), and another surface (23") which is smooth,
    (c) said second layer (23b) overlies said smooth surface (23"),
    (d) said second layer (23b) includes said passage means (24),
    (e) said first layer (23a) and said second layer (23b) each include respective apertures (42a,42b) which are aligned in pairs and which provide a communication between said passage means (24) and said mold cavity (11),
    (f) seal means (20) are disposed in fluid-tight manner between said second layer (23b) and said smooth surface (23") surrounding each said pair of apertures (42a; 42b).

* * * * *